United States Patent Office 2,832,671
Patented Apr. 29, 1958

2,832,671

STABILIZATION OF LIQUID SULFUR TRIOXIDE

Kenneth J. Shaver, Stoneham, and Randolph Perry, Jr., Arlington, Mass., assignors to Monsanto Chemical Company, St. Louis, Mo., a corporation of Delaware No Drawing. Application March 29, 1957
Serial No. 649,321

8 Claims. (Cl. 23—174)

This invention relates to the stabilization of sulfur trioxide and high-strength oleums by the addition thereto of minor amounts of dimethyl sulfite.

Sulfur trioxide is recognized to exist in three forms, i. e. the γ-form having a melting point of about 16.8° C., the β-form having a melting point of about 32.5° C., and the α-form having a melting point of about 62.3° C. The solid γ-form has an ice-like appearance and the solid β- and α-forms each have an asbestos-like appearance. Whereas the β- and α-forms can be depolymerized by heating under pressure preferably at about 110° C. or higher for a period of several hours this procedure is cumbersome and expensive and therefore is not generally acceptable in the chemical process industries. Furthermore it is known that the presence of traces of water readily catalyzes the conversion of γ-sulfur trioxide to the higher melting point β- and α-forms, thus unless the depolymerized sulfur trioxide is stored and used under substantially anhydrous conditions it is again readily repolymerized.

Many industrial processes are particularly adaptable to the use of sulfur trioxide, per se, in contradistinction to the use of sulfuric acid or oleum. Thus, for example in the sulfonation of organic compounds such as the alcohols and hydrocarbons to produce the alkyl sulfates and alkylaryl sulfonates, which are the active components in many synthetic detergent formulations, the use of sulfuric acid produces a product having a substantial amount of water therein whereas the use of sulfur trioxide effects a substantially water-free product. Furthermore the presence of the reaction water in the sulfonation process employing sulfuric acid requires the use of a varying excess of the sulfuric acid, which must be removed or neutralized at the completion of the desired reaction. Thus the use of sulfuric acid or oleum presents the problem of the presence of relatively large amounts of sulfate salts in the product and the disposal of spent acid. In contradistinction thereto the use of sulfur trioxide avoids these problems and produces the desired product in high yields with the further advantage of employing only about the theoretical quantity of the sulfonation agent. Accordingly, it is readily seen that a stable liquid sulfur trioxide is important to the progress of the direct sulfonation processes.

Various materials have been suggested as stabilizers for liquid sulfur trioxide. It is understood that the principal commercial sulfur trioxide is presently stabilized by the addition thereto of minor amounts of boron compounds as described in U. S. Patent No. 2,458,718, such as boron trioxide. However, the incorporation of boron trioxide and the like require a heat treatment of the sulfur trioxide in a closed vessel at temperatures at from about 60° to about 100° C. preferably for from about two to about ten hours. Accordingly, there is a great need for additional stabilizer systems.

It is the principal object of this invention to provide a novel liquid sulfur trioxide composition which is stable for long periods of time at temperatures above about 20° C. Another object of this invention is to provide a stabilizer for liquid sulfur trioxide which is effective in relatively small amounts and can be readily incorporated therein without the requirement of a lengthy, relatively high temperature heat treatment. Other objects will be apparent from the following disclosure.

It has now been found that the addition of minor amounts of dimethyl sulfite to liquid sulfur trioxide effectively inhibits the polymerization thereof to the higher melting point β- and α-forms, even in the presence of water. More specifically it has been found that from about 0.1 to about 2 weight percent of dimethyl sulfite, based on the weight of the sulfur trioxide, provides a composition which is stable for long periods of time and provides a suitable composition for the direct sulfonation process as hereinabove described.

The dimethyl sulfite can be added to the sulfur trioxide or oleum obtained from any suitable source or the desired quantity of dimethyl sulfite can be added batchwise, or continuously in the desired proportionate amount, to the vessel in which the sulfur trioxide or oleum is collected. Generally it is preferable to employ the latter method whereby the sulfur trioxide is inhibited substantially immediately after it is condensed. The dimethyl sulfite is readily dispersed therein without the application of any heat treatment.

The relative effectiveness of stabilizer systems for liquid sulfur trioxide can be readily determined in the following manner. Anhydrous sulfur trioxide was obtained as for example by heating a sample of 65% oleum in a closed system free from moisture, said system being vented through a tube packed with phosphorus pentoxide, and distilling the sulfur trioxide through a packed column and a phosphorus pentoxide drying tube. The dry sulfur trioxide gas was then condensed to a liquid and collected through an eight-tube delivery manifold to sample vials. The vials were provided with two pockets such that a stabilizer and water, in the form of 96.5% sulfuric acid, could be added to the anhydrous liquid sulfur trioxide after the vial had been sealed. The vials can be sealed off in place or can be frozen in a Dry Ice-acetone mixture and then sealed off under vacuum. In the latter case the frozen samples can be liquified by placing in an oven at about 110° C. for at least about four hours since the heat transfer through the solid material is relatively poor. Thus the former method is preferred. Subsequently the desired quantity of sulfuric acid was added to a non-modified vial and the sulfur trioxide condensed and collected therein, then the stabilizer was added and the vial sealed. The sealed liquid samples were then equilibrated in a water bath at 20.0±0.5° C. and thereafter fractionally seeded by inserting the tips of the vials in a Dry Ice-acetone mixture for 5 seconds whereby about 0.1 ml. of the liquid sulfur trioxide would freeze. The vials were inverted and the volume of liquid sulfur trioxide determined. Then the vials were returned to the water bath with the liquid sulfur trioxide in contact with the seed crystals. Thereafter the vials were withdrawn from the water bath at various times and the volume of liquid sulfur trioxide determined whereby the percent of liquid sulfur trioxide remaining at various times is a direct measure of the rate of polymerization to the β- and α-forms. It was found that the plot of the percent liquid remaining vs. time was usually a straight line relationship after a short induction period. The slope of this line gives a figure which indicates the relative stability of the system under observation. A slope of zero indicates substantially complete stability. As the slope increases the relative stability becomes poorer until at about 1.0 the system is unstable. Generally a partial stability of up to a slope of about 0.4 is suitable for consideration as a commercial system.

The aforesaid procedure effects a substantial saving in time for the evaluation of stabilizer systems. Thus this procedure effects solidification of unstable sulfur trioxide systems in minutes or hours whereas the natural process requires days. For example a sample of liquid sulfur trioxide containing about 0.15 percent water will solidify within a couple of days under normal storage conditions, but a similar sample containing 0.85 percent dimethyl sulfite added thereto is still liquid after long storage under normal conditions.

Various illustrative examples are set out in the following table.

| Example | Methyl Sulfite | | $H_2SO_4$ | | $SO_3$ grams | Slope |
|---|---|---|---|---|---|---|
| | mg. | wt. Percent | mg. | Percent $H_2O$ | | |
| 1 | | | 28.5 | 0.028 | 21.176 | 1.1 |
| 2 | | | 115.3 | 0.118 | 20.713 | 2.0 |
| 3 | | | 289.5 | 0.29 | 21.464 | 2.6 |
| 4 | 95 | 0.48 | 42 | 0.045 | 20.018 | 0.00 |
| 5 | 151 | 0.62 | 41 | 0.036 | 24.212 | 0.00 |
| 6 | 129 | 0.62 | 60 | 0.061 | 20.673 | 0.1 |
| 7 | 309 | 1.37 | 166 | 0.157 | 22.514 | 0.00 |
| 8 | 354 | 1.52 | 89 | 0.081 | 23.289 | 0.00 |
| 9 | 339 | 1.52 | 138 | 0.131 | 22.312 | 0.00 |
| 10 | 312 | 1.53 | 225 | 0.234 | 20.363 | 0.1 |
| 11 | 304.8 | 1.40 | 186.5 | 0.182 | 21.746 | 0.00 |
| 12 | 313.4 | 1.59 | 263.2 | 0.284 | 19.656 | 0.00 |
| 13 | 215.2 | 1.06 | 128.7 | 0.135 | 20.200 | 0.00 |
| 14 | 303.5 | 1.51 | 241.7 | 0.254 | 20.092 | 0.00 |

Examples 1 through 3 show the effect of increasing amounts of water in an unstabilized system. Examples 4 through 10 were run according to the above-described method whereby the system was heat treated prior to placing in the water bath and seeding at about 20° C. Examples 11 and 12 were placed in a water bath overnight at about 33° C. prior to placing in the water bath at 20° C. and seeding, and Examples 13 and 14 were held at about 25° C., the approximate temperature of collection, for about one hour prior to placing in the water bath at 20° C. and seeding.

All of the examples having a slope of zero were reseeded several times without being able to permanently seed the system. The unstabilized samples solidified at a rapid rate. In some cases of extreme unstability the sample would seed itself in the water bath at 20° C. and the solidification process would then be propagated at a rate too fast to be reasonably measured by the present procedure.

It was found that liquid sulfur trioxide can be effectively stabilized by the addition of about 0.5 percent of dimethyl sulfite in the presence of about 0.05 percent water, 1 percent of dimethyl sulfite in the presence of up to about 0.13 percent water and about 1.5 percent dimethyl sulfite can tolerate at least about 0.28 percent water. Larger quantities of dimethyl sulfite will permit a greater tolerance of water, but since it is desirable to maintain the strength of the sulfur trioxide at an order of about 98 percent, larger quantities of stabilizer are not desired. Furthermore the principal problem is met with systems which only contain or are subject to conditions which would permit the introduction of trace amounts of water, therefore up to about 2 percent of the dimethyl sulfite stabilizer is normally adequate for commercial use.

We claim:

1. A method of stabilizing liquid sulfur trioxide to substantially inhibit the polymerization thereof comprising incorporating therein a minor amout of dimethyl sulfite sufficient to stabilize said liquid sulfur trioxide.

2. A method of stabilizing liquid sulfur trioxide to substantially inhibit the polymerization thereof comprising incorporating and mixing from about 0.1 to about 2 percent by weight of dimethyl sulfite in the liquid sulfur trioxide.

3. The method of claim 2, wherein from about 0.5 to about 1.5 percent of dimethyl sulfite is employed.

4. A method of stabilizing liquid sulfur trioxide containing up to about 0.3 percent of water to substantially inhibit the polymerization thereof comprising incorporating and mixing up to about 2 percent by weight of dimethyl sulfite in the said liquid sulfur trioxide.

5. A composition of matter comprising liquid sulfur trioxide and a minor amout of dimethyl sulfite incorporated therein sufficient to substantially inhibit the polymerization of said liquid sulfur trioxide.

6. A composition of matter comprising liquid sulfur trioxide and from about 0.1 to about 2 percent by weight of dimethyl sulfite incorporated therein whereby the liquid sulfur trioxide is characterized by an improved storage stability wherein polymerization thereof is substantially inhibited.

7. The composition of matter of claim 6, wherein from about 0.5 to about 1.5 percent by weight of dimethyl sulfite is incorporated therein.

8. A composition of matter comprising liquid sulfur trioxide, up to about 0.3 percent by weight of water, and up to about 2 percent by weight of dimethyl sulfite incorporated therein whereby the liquid sulfur trioxide is characterized by an improved storage stability wherein polymerization thereof is substantially inhibited.

No references cited.